United States Patent [19]

Nakamura et al.

[11] Patent Number: 4,541,467
[45] Date of Patent: Sep. 17, 1985

[54] HEAVY DUTY PNEUMATIC RADIAL TIRES

[75] Inventors: Masao Nakamura; Kenji Karato, both of Tokyo, Japan

[73] Assignee: Bridgestone Tire Company Limited, Tokyo, Japan

[21] Appl. No.: 580,271

[22] Filed: Feb. 16, 1984

Related U.S. Application Data

[63] Continuation of Ser. No. 422,915, Sep. 24, 1982, abandoned.

[30] Foreign Application Priority Data

Nov. 24, 1981 [JP] Japan ........................... 56-187997

[51] Int. Cl.$^4$ ...................... B60C 9/08; B60C 15/06
[52] U.S. Cl. .................................. 152/548; 152/541; 152/543; 152/546; 152/547; 152/554
[58] Field of Search ............ 152/354 R, 354 RB, 355, 152/356 R, 356 A, 362 R, 362 CS

[56] References Cited

U.S. PATENT DOCUMENTS

| 3,888,292 | 6/1975 | Menell et al. | 152/362 R |
| 4,046,183 | 9/1977 | Takahashi et al. | 152/362 R |
| 4,085,787 | 4/1978 | Maiocchi | 152/362 R |
| 4,086,948 | 5/1978 | Suzuki et al. | 152/362 CS |
| 4,209,050 | 6/1980 | Yoshida et al. | 152/362 R |
| 4,250,939 | 2/1981 | Shibata et al. | 152/354 R |

FOREIGN PATENT DOCUMENTS

| 2127163 | 10/1972 | France | 152/362 R |
| 2375061 | 9/1976 | France | 152/362 R |
| 7113705 | 5/1972 | Netherlands | 152/362 R |

Primary Examiner—Lois E. Boland
Attorney, Agent, or Firm—Sughrue, Mion, Zinn, Macpeak and Seas

[57] ABSTRACT

A heavy duty pneumatic radial tire is disclosed, which comprises a tread portion, a pair of side portions, a pair of bead portions each reinforced with a bead ring, a radial carcass ply, a metal cord reinforcing layer and a composite rubber filler. In this tire, the carcass ply is a rubberized layer of aromatic polyamide fiber cords and a tip of its turnup portion terminates at a position lower than an upper end of a rim flange when the tire is mounted on a rim. In the metal cord reinforcing layer, one end facing the turnup portion terminates over the tip of the turnup portion and the other end facing the carcass ply extends toward the side portion over a position corresponding to the above-mentioned one end facing the turnup portion. The rubber filler consists of a hard rubber stock and a soft rubber stock, wherein the hard rubber stock extends above the bead ring along the carcass ply over a position corresponding to the end of the reinforcing layer facing the carcass ply, and the soft rubber stock extends toward the side portion over the hard rubber stock between the hard rubber stock and the reinforcing layer facing the turnup portion and the lower end thereof locates between the hard rubber stock and the turnup portion in a wedge shape.

4 Claims, 2 Drawing Figures

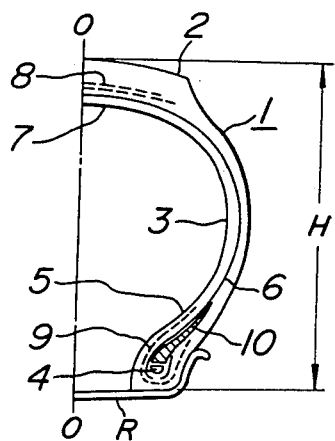
FIG_1
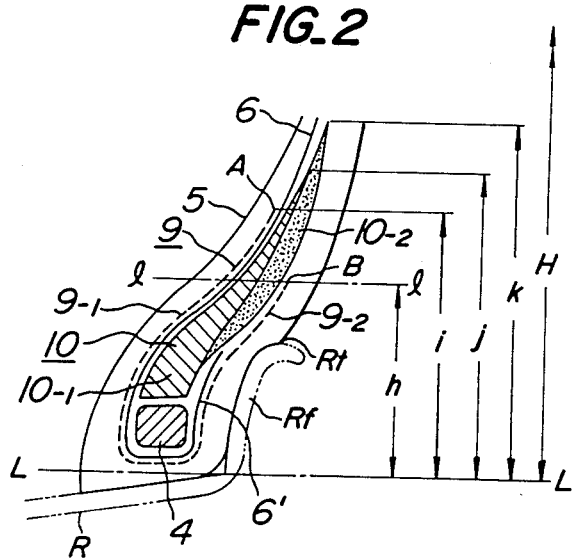
FIG_2

HEAVY DUTY PNEUMATIC RADIAL TIRES

This application is a continuation of application Ser. No. 422,915 filed Sept. 24, 1982, now abandoned.

This invention relates to heavy duty pneumatic radial tires having an improved bead portion and using aromatic polyamide fiber cords as a carcass ply.

In general, there are known tires using steel cords as a reinforcement for both carcass ply and belt layer (hereinafter referred to as all-steel tire) and tires using cords of organic fiber such as nylon, polyester or the like for a carcass ply and steel cords for belt layer (hereinafter referred to as combination tire) as the heavy duty pneumatic radial tire. As is well-known, the radial tire of this type has a structure such that reinforcing cords for the carcass ply are arranged in a direction substantially parallel to a radial plane of the tire (or in a direction substantially perpendicular to an equatorial plane of the tire). In this case, a belt composed of plural plies each containing cords of a material having a considerably high elastic modulus such as steel or the like arranged at a small angle with respect to the equatorial plane of the tire, the cords of which plies being crossed with each other, is superimposed about a crown portion of the carcass.

In case of the all-steel tire, since the strength of the cord is high, even if the tread portion of the tire is worn out, this portion can be renewed to stand reuse, which is an advantage in view of cost. However, when the tire is subjected to a deep cut under bad road conditions, water penetrates from the cut damaged portion into the cord to produce rust thereon, whereby premature failures are apt to be caused due to cord breaking and cord separation. Furthermore, the all-steel tire has a relatively large weight, which is a disadvantage in view of fuel consumption.

On the other hand, in case of the combination tire, the weight is relatively small, which is an advantage in view of fuel consumption. However, the strength of the fiber cord is low, so that it is necessary to increase the number of carcass plies for compensation of the reduction of cord strength. Also the cord is susceptible to fatigue and consequently it is difficult to reuse the tire by renewing of tread portion. Furthermore, the fiber cord is low in the elastic modulus, so that the increase of tire size with lapse of time is produced by cord creeping in use. As a result, the combination tire has a serious drawback of using no combination of old tire with new tire.

Lately, it has been attempted to use fiber cords of aromatic polyamide having elastic modulus and strength considerably higher than those of nylon or polyester cord as a reinforcement for carcass. In case of using the aromatic polyamide fiber cords, the reinforcing effect is achieved when the number of carcass ply is usually 1 ply, exceptionally 2 plies. However, such a reduction of the ply number is accompanied with a reduction of rigidity in bead portion required for the tire, whereby the bead portion is deformed excessively, which frequently produces separation failure at both end parts of the carcass ply. Thus, the use of the aromatic polyamide fiber cords in the carcass ply for radial tire has not yet been put to practical use.

It is, therefore, an object of the invention to provide an improved combination tire which can advantageously solve the aforementioned drawbacks by using the aromatic polyamide fiber cords as a reinforcement for carcass of radial tire.

According to the invention, there is the provision of in a heavy duty pneumatic radial tire comprising a tread portion, a pair of side portions extending radially inward from both sides of said tread portion, a pair of bead portions extending from said side portions and each reinforced with a bead ring, a radial carcass ply reinforcing said portions and wrapped around said bead rings from inside toward outside to form turnup portions, a metal cord reinforcing layer arranged outside said carcass ply and its turnup portion in said bead portion, and a composite rubber filler of hard and soft rubber stocks arranged inside said carcass ply and its turnup portion in said bead portion, the improvement wherein:

said carcass ply is a rubberized layer of aromatic polyamide fiber cords and a tip of its turnup portion terminates at a position lower than an upper end of a rim flange when the tire is mounted on a rim;

one end of said metal cord reinforcing layer facing said turnup portion terminates over said tip of the turnup portion and the other end thereof facing said carcass ply extends toward said side portion over a position corresponding to said one end of the reinforcing layer facing said turnup portion; and said hard rubber stock of the rubber filler extends above said bead ring along said carcass ply over a position corresponding to the end of said metal cord reinforcing layer facing said carcass ply, and said soft rubber stock of the rubber filler extends toward said side portion over said hard rubber stock between said hard rubber stock and said metal cord reinforcing layer facing said turnup portion and a lower end of said soft rubber stock locates between said hard rubber stock and said turnup portion in a wedge shape.

BRIEF DESCRIPTION OF THE DRAWINGS

The invention will now be described in detail with reference to the accompanying drawings, wherein:

FIG. 1 is a schematically radial half section of an embodiment of the heavy duty pneumatic radial tire according to the invention; and FIG. 2 is a partly enlarged sectional view of a bead portion in the tire of FIG. 1.

DESCRIPTION OF THE PREFERRED EMBODIMENT

In FIG. 1 is schematically shown a radial half section of the tire according to the invention and FIG. 2 shows a partly enlarged view of a bead portion thereof. Although the left half section is omitted with respect to an equatorial plane O—O of the tire in FIG. 1, the right and left sections are symmetrical with respect to the equatorial plane of the tire.

In the tire 1, an annular tread portion 2 locates at a circumferentially central part of the tire, a side portion 3 extends radially inward from each side of the tread portion 2, and a bead portion 5 reinforced with a bead ring 4 extends from the side portion, and these portions are reinforced with a radial carcass ply 6. The carcass ply 6 is wrapped around the bead ring 4 from inside toward outside to form a turnup portion 6'.

According to the invention, the carcass ply 6 is one or at most two rubberized layers containing aromatic polyamide fiber cords known by a trade name "Kevlar" as a reinforcement, these cord being arranged in a radial direction of the tire or in a direction substantially perpendicular to the equatorial plane O—O. The tip of the turnup portion 6' of the carcass ply terminates at a position lower than an upper end $R_t$ of a rim flange $R_f$ when the tire is mounted on a rim R.

About a crown portion 7 of the carcass ply 6 is superimposed a belt layer 8 over a width of the tread portion 2 in usual manner, whereby the rigidity of the crown portion is increased. The belt layer 8 consists of two rubberized plies each containing inextensible cords such as steel cords inclined at an angle of 10°14 25° with respect to the equatorial plane O—O, the cords of these plies being crossed with each other according to usual manner.

In the bead portion 5, a metal cord reinforcing layer 9 is arranged outside the carcass ply 6 and its turnup portion 6', and a composite rubber filler 10 of hard and soft rubber stocks is arranged inside the carcass ply and its turnup portion.

The metal cord reinforcing layer 9 is a rubberized layer of metal cords inclined at an angle of 55°–80° with respect to the cords of the carcass ply, and consists of a portion 9-1 extending toward the side portion 3 along the carcass ply 6 and a portion 9-2 extending toward the side portion 3 along the turnup portion 6' over the tip thereof. A distance i from a reference line L—L at the lower end of the bead portion 5 to an upper end A of the portion 9-1 in parallel with the equatorial plane O—O is 5 to 30 mm longer than a distance h from the reference line to an upper end B of the portion 9-2. Furthermore, the distance i is desirable to be within a range of 20–40% of a distance H from the reference line to the top of the tread portion 2 in parallel with the equatorial plane O—O.

According to the invention, a space ratio, which is defined by cord interval/(cord interval+cord diameter), of the metal cord reinforcing layer 9 is desirable to be within a range of 1.3–1.6 times higher than that of the carcass ply 6. The space ratio is somewhat different at measuring positions together with the cord angle of the metal cord reinforcing layer 9 and is determined in the portion 9-1 and adjacent carcass ply 6 located on or near a position of the distance h or on a line l—l.

According to the invention, a composite rubber filler 10 of hard and soft rubber stocks is further arranged between the carcass play 6 and its turnup portion 6' protected with the metal cord reinforcing layer 9. The rubber filler 10 consists of a hard rubber stock 10-1 extending taperingly above the bead ring 4 along the carcass ply 6 toward the side portion 3 and a soft rubber stock 10-2 penetrating at its lower end between the hard rubber stock 10-1 and the turnup portion 6' in a wedge shape and extending between the portion 9-2 of the metal cord reinforcing layer 9 and the hard rubber stock 10-1 toward the side portion 3. The hard and soft rubber stocks 10-1 and 10-2 have Shore A hardnesses of 70°–90° and 50°–65°, respectively. In this case, the difference in the hardness between both rubber stocks is desired to be 15°–30°. The distances j and k from the reference line L—L at the lower end of the bead portion 5 to upper ends of the hard and soft rubber stocks have a relationship of $i<j<k$ together with the distance i from the reference line to the upper end of the portion 9-1 of the metal cord reinforcing layer 9. In this case, the difference between two distances is favorable to be 5–20 mm though it somewhat depends upon the kind of tire.

In order to confirm the performances of the tire having the above mentioned structure, durability test was made with respect to the tire according to the invention having a tire size of 750R16 14PR together with the conventional tire having the same tire size. In this case, main dimensions of each tire to be tested are shown in the following table.

TABLE

|  |  | Invention tire | Conventional tire |
|---|---|---|---|
| Carcass (6) | Ply structure | 1 ply, radial | 1 ply, radial |
|  | Kind of cord | Kevlar, 3000 d/2 | steel (1 × 3) + (9 + 15) 0.15 mm |
|  | Tip of turnup portion | 3mm lower than upper end ($R_t$) of rim flange ($R_f$) | 3 mm higher than upper end ($R_t$) of rim flange ($R_f$) |
| Metal cord reinforcing layer (9) | Cord angle | 60° | 60° |
|  | Distance (h) | 45 mm | 45 mm |
|  | Distance (i) | 60 mm | 60 mm |
| Hard rubber stock (10-1) | Hardness | 83° | 82° |
|  | Distance (j) | 65 mm | 65 mm |
| Soft rubber stock (10-2) | Hardness | 55° |  |
|  | Distance (k) | 80 mm |  |

Note:
(1) The arrangement of each constructional portions in both the tires is based on FIGS. 1 and 2.
(2) As the rubber filler of the conventional tire, a hard rubber stock having a volume equal to the total volume of hard and soft rubber stocks in the invention tire was used alone.

The test tire was mounted on a rim of 600 GS under an internal pressure of 8.0 kg/cm$^2$ and run on a smooth steel drum with a diameter of 1.6 m, which was rotated by the driving of a motor, at a speed of 60 km/hr under a load of 3,000 kg over a distance of 10,000 km.

After the completion of the running, each of the constructional portions was observed by cutting out the test tire. As a result, cracks (or separation failure) were discontinuously produced at end parts of the turnup portion 6' of the carcass ply and the portion 9-2 of the metal cord reinforcing layer in the conventional tire in the circumferential direction thereof. On the other hand, there was observed no problems in the invention tire.

According to the invention, the aromatic polyamide fiber cords are used as a reinforcement for the carcass ply of the tire and the tip of the turnup portion of the carcass ply is located between the metal cord reinforcing layer and the hard rubber stock through the wedge-shaped soft rubber stock at a region lower than the height of the flange. This region 10 subjected to salient compression under an influence of internal pressure on the rim flange but protected against the bending deformation produced during the running, while the portion of the metal cord reinforcing layer extending over the turnup portion toward the side portion is lower than the portion located side the carcass ply and the composite rubber filler of hard and soft rubber stocks is disposed between both the portions of the metal cord reinforcing layer to control and absorb stress applied to the ends of the reinforcing layer when the tire is subjected to forces such as load and the like. Therefore, the durability of the tire can considerably be improved by synergistic action of the carcass ply, metal cord reinforcing layer and composite rubber filler.

What is claimed is:

1. A heavy duty pneumatic radial tire comprising;

a tread portion, a pair of side portions extending radially inward from both sides of said tread portion, a pair of bead portions extending from said side portions and each reinforced with a bead ring, a radial carcass ply of cords reinforcing said side and bead portions and wrapped around said bead rings from inside toward outside to form turnup portions, a metal cord reinforcing layer of metal cords inclined at an angle of 55°–80° with respect to the cords of said carcass ply and arranged outside said carcass ply and its turnup portion in said bead portion, a composite rubber filler of hard and soft rubber stocks arranged inside said carcass ply and its turnup portions in said bead portion, said carcass ply comprising a single rubberized layer of aromatic polyamide fiber cords and a tip of its turnup portion terminating at a position lower than an upper end of a rim flange when the tire is mounted on a rim;

one end of said metal cord reinforcing layer facing said turnup portion terminating above said tip of the turnup portion of said carcass and the other end thereof facing said carcass ply extending toward said side portion 5–30 mm above a position corresponding to said one end of the reinforcing layer facing said turnup portion; and said hard rubber stock of the rubber filler extending above said bead ring 5–20 mm along said carcass ply above a position corresponding to the end of said metal cord reinforcing layer facing said carcass ply, and said soft rubber stock of the rubber filler extending toward said side portion 5–20 mm above said hard rubber stock and disposed between said hard rubber stock and said metal cord reinforcing layer facing said turnup portion, and a lower end of said soft rubber stock being located between said hard rubber stock and said turnup portion in a wedge shape, said tip of the turnup portion of said carcass ply being located between said metal cord reinforcing layer on one side and said wedge-shaped soft rubber stock on the other side at a region lower than the height of said flange to protect said tip of the turnup portion from bending deformation when the tire is deflected.

2. A tire as claimed in claim 1, wherein said hard rubber stock has a Shore A hardness of 70°–90° and said soft rubber stock has a Shore A hardness of 50°–65°.

3. A tire as claimed in claim 2, wherein a difference in hardness between said hard and soft rubber stocks is 15°–30°.

4. A tire as claimed in claim 1, wherein said metal cord reinforcing layer has a space ratio between cords in the circumferential direction of 1.2 to 1.6 times higher than that of said carcass ply.

* * * * *